United States Patent
Beck

(10) Patent No.: US 7,118,099 B2
(45) Date of Patent: Oct. 10, 2006

(54) SELFPUMPING HYDROPNEUMATIC SPRING STRUT WITH INTERNAL LEVEL CONTROL

(75) Inventor: Hubert Beck, Eitorf (DE)

(73) Assignee: ZF Sachs AG, Eitorf (DE)

(*) Notice: Subject to any disclaimer, the term of this patent is extended or adjusted under 35 U.S.C. 154(b) by 186 days.

(21) Appl. No.: 10/668,568

(22) Filed: Sep. 23, 2003

(65) Prior Publication Data

US 2004/0118648 A1 Jun. 24, 2004

(30) Foreign Application Priority Data

Sep. 24, 2002 (DE) .......................... 102 44 484

(51) Int. Cl.
| F16F 9/50 | (2006.01) |
| F16F 9/34 | (2006.01) |
| F16F 9/512 | (2006.01) |
| B60G 17/00 | (2006.01) |
| B60G 17/08 | (2006.01) |

(52) U.S. Cl. .............................. 267/64.17; 188/322.13; 267/DIG. 2

(58) Field of Classification Search .............. 267/64.17, 267/64.16, DIG. 2, 64.26; 188/266.1, 322.13, 188/266.2, 322.22, 322.2, 322.15, 269; 280/124.159, 280/124.158; 701/37–38
See application file for complete search history.

(56) References Cited

U.S. PATENT DOCUMENTS 3,837,444 A * 9/1974 Allinquant et al. ......... 188/315
4,993,693 A * 2/1991 Lohr et al. ................ 267/64.17
5,046,755 A * 9/1991 Runkel et al. ......... 280/124.101
5,509,512 A * 4/1996 Grundei ..................... 188/284

FOREIGN PATENT DOCUMENTS

| DE | 4022099 | * 12/1991 |
| DE | 10244484 | * 12/2003 |
| GB | 2 035 511 | 6/1980 |

* cited by examiner

*Primary Examiner*—Douglas C. Butler
(74) *Attorney, Agent, or Firm*—Cohen, Pontani, Lieberman & Pavane

(57) ABSTRACT in particular for a motor vehicle, includes a high pressure chamber containing a gas cushion acting as a spring, and a working cylinder which is filled with damping medium under pressure of the gas cushion. A working piston carried by a hollow piston rod divides the working cylinder into two working spaces, wherein one of the working spaces is connected to the high pressure chamber to drive the piston under the pressure of the gas cushion, the piston having at least one non-return valve which permits flow from the one working space to the other working space. A piston pump has a pump cylinder formed by the hollow piston rod and a hollow pump rod received in the piston rod, the pump rod having a bore with one end connected to a low pressure chamber and another end carrying a non-return valve which permits flow from the low pressure chamber into the hollow piston rod, and a cut-off orifice which connects the one working space to the low pressure chamber as a function of the position of the piston in the working cylinder. An adjustable damping valve is connected to a duct running from the other working space, the valve having an actuating element acted on by the pressure in the high pressure chamber and the pressure in the low pressure chamber.

8 Claims, 2 Drawing Sheets

SELFPUMPING HYDROPNEUMATIC SPRING STRUT WITH INTERNAL LEVEL CONTROL

BACKGROUND OF THE INVENTION

1. Field of the Invention

The invention relates to a selfpumping hydropneumatic spring strut with internal level control, in particular for motor vehicles, with a working cylinder filled with damping medium under the pressure of at least one gas cushion arranged in a high-pressure chamber and acting as a spring, which working cylinder is subdivided into two working spaces by a working piston carried by a hollow piston rod. A piston pump which is driven by means of the spring movements and conveys damping medium out of a low-pressure chamber into the working space connected to the high-pressure chamber has a pump cylinder formed by the hollow piston rod, into which penetrates a hollow pump rod which is fastened to the working cylinder and at its front end carries a suction valve and the bore of which is connected to the low-pressure chamber. A cut-off orifice in the pump rod can be closed as a function of the position of the working piston in the working cylinder and connects the working space connected to the high-pressure chamber to a cut-off duct issuing into the low-pressure chamber. The damping medium flows through the working piston in one direction via at least one nonreturn valve, a duct running from one working space to an adjustable damping valve.

2. Description of the Related Art

Spring struts of this type are known (U.S. Pat. No. 4,993,693), in which the working cylinder is subdivided into two working spaces by a working piston carried by a piston rod and in which nonreturn valves are arranged in such a way that the flow of the damping medium runs in the same direction. This means that the damping medium constantly flows in one direction, irrespective of the direction of movement of the working piston, the damping medium in each case flowing from one working space via a duct, past an adjustable damping valve, directly into the high-pressure space or, with the piston rod extended under corresponding pressure conditions, into the other working space. Since the hollow pump rod is connected to the low-pressure space via a bore, in such a configuration both an internal level control of the system and an externally activatable, continuously adjustable damping-force control can be brought about.

Furthermore, spring struts are known (GB 2,035,511, U.S. Pat. No. 3,837,444), in which the working cylinder is subdivided into two working spaces by a working piston carried by a piston rod and in which the working piston is provided with valves for generating a damping force. In this case, a corresponding damping valve is provided for each direction of movement of the working piston. These damping valves serve for generating a specific predetermined damping force in the respective piston speed range and/or load range.

SUMMARY OF THE INVENTION

The object of the invention is to develop a selfpumping hydropneumatic spring strut with internal level control in such a way that, with an increasing charge or else with the corresponding discharge in the tension and compression stage, damping is set automatically, over the entire stroke range of the working piston, without the aid of external activating devices.

This object is achieved, according to the invention, in that the adjustable damping valve has an actuating element which is acted upon by the pressure of the high-pressure chamber and of the low-pressure chamber.

It is advantageous, in this case, that a damping force corresponding to the respective load state is achieved by means of the pressure of the high-pressure chamber and the pressure of the low-pressure chamber which both act on the actuating element. As soon as a pressure change occurs between the low-pressure chamber and the high-pressure chamber, the actuating element of the adjustable damping valve adapts automatically to the new situation and changes its setting and consequently also the damping force in the load state which then prevails at that particular moment.

According to a further essential feature, there is provision for the actuating element to be spring-loaded in at least one direction. It is advantageous in this case that basic damping can be achieved by means of a spring loading of the actuating element.

A further embodiment provides for the damping valve to have a valve which is controlled by the actuating element. In this case, it is advantageous that the damping valve which has the actuating element is provided with the actual valve closing the flow duct, and this valve may be designed as a spring washer valve. However, other valve variants are also possible, such as, for example, a seat valve or a helical spring valve, or else merely a control slide can be connected to the actuating element.

In an embodiment which is beneficial in manufacturing terms, the actuating element is connected in one piece to the spring strut in a corresponding housing or else can be produced as a separate component, in which case the flow acts upon the actuating element from the high-pressure chamber and/or the low-pressure chamber via corresponding flow connections. In this case, in an advantageous embodiment, at least one flow connection is provided with a throttle point.

According to a further feature, the control element is provided with a piston which is arranged in a housing and one end face of which is acted upon by the pressure of the low-pressure chamber and the other end face of which is acted upon by the pressure of the high-pressure chamber.

To achieve a predetermined input or output damping, there is provision for the actuating element to be provided with at least one stop.

Preferred exemplary embodiments of the invention are illustrated in the drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
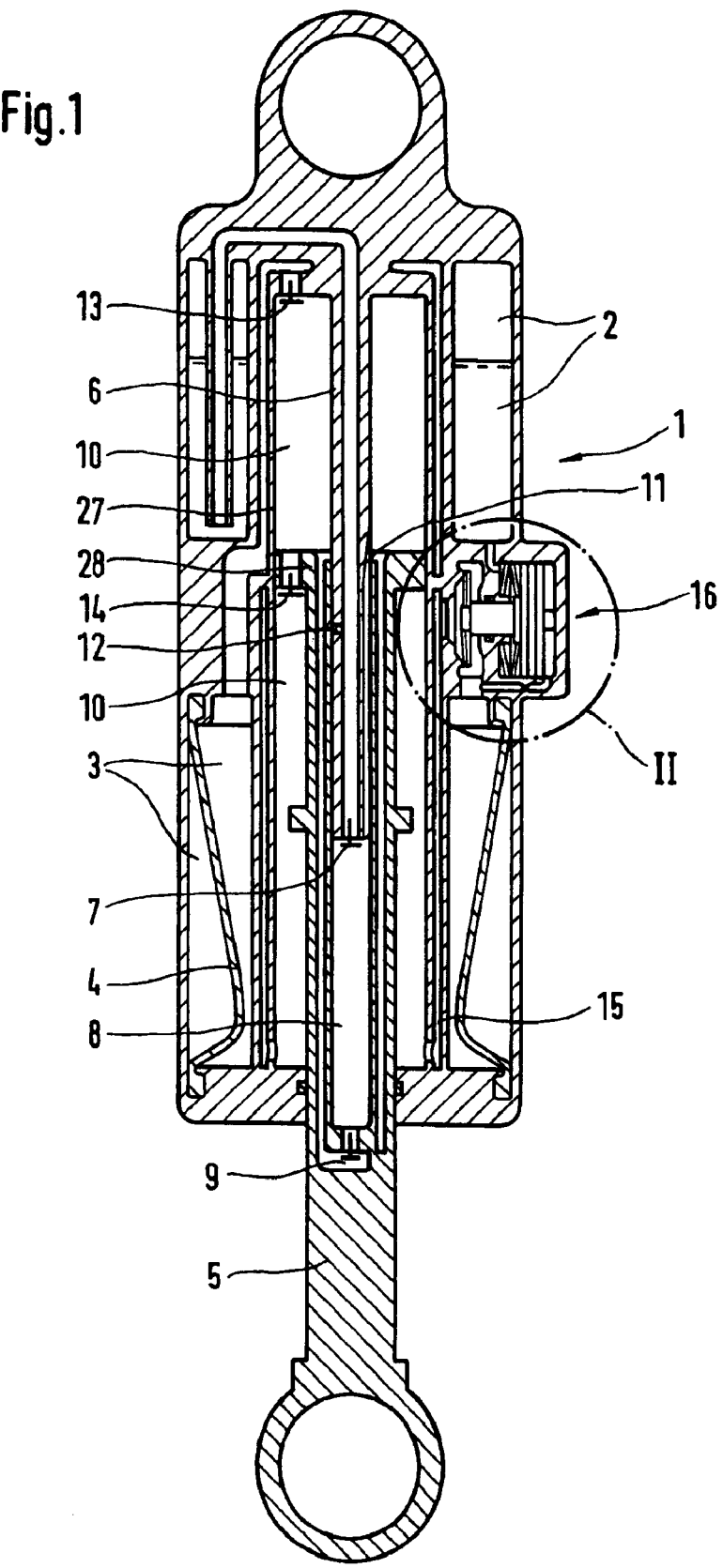
FIG. 1 shows in section a selfpumping hydropneumatic spring strut with internal level control and with a corresponding damping valve.

The level control device for motor vehicles, which is illustrated in FIG. 1, consists essentially of the working cylinder 27 of the spring strut, a working piston 28 at the end of a piston rod 5 sliding in the working cylinder. The working cylinder 27 is closed off on one end by a bottom and on the other end by a cover, through which the piston rod 5 emerges, sealed off. The bottom is fastened to the body of the vehicle by means of fastening parts and the piston rod is fastened to the axle of the vehicle by means of a fastening part in a way not illustrated.

Furthermore, the spring strut 1 has a low-pressure chamber 2 and a high-pressure chamber 3 which are both filled partially with damping medium and compressed gas, the high-pressure chamber 3 in this case being provided, for reasons of diffusion, with a separating element 4 for separating the damping medium from the compressed gas.

By the piston rod 5 being retracted and extended while the motor vehicle is being driven, the damping medium is sucked out of the low-pressure chamber 2 via the hollow pump rod 6 and the nonreturn valve 7 into the pumping space 8 and is supplied from there via a further nonreturn valve 9 to the working space 10. Since the working space 10 is connected to the high-pressure chamber 3, the compressed gas in the high-pressure chamber 3 is constantly further pressurized and the piston rod 5, together with the working piston 28, is in this case pushed outward.

When the level position illustrated in FIG. 1 is reached, the bypass 11 prevents the piston rod 7 or the working piston 28 from being pushed further out. When the motor vehicle is discharged of its load, the piston rod 5 is further extended and the cut-off orifice 12 consequently acquires direct access to the working space 10 and ensures pressure compensation between the high-pressure chamber 3 and the low-pressure chamber 2, so that the vehicle body is subsequently lowered again, that is to say the piston rod 5, together with the working piston 28, penetrates into the working cylinder 27 again.

The damping of the spring strut 1 takes place essentially in that, by the piston rod 5 being retracted, the bottom nonreturn valve 13 closes, the piston nonreturn valve 14 opening. The damping medium displaced out of the working space 10 by the piston rod 5 is led through the damping valve 16 via an annular duct 15 and supplied to the high-pressure chamber 3.

By the piston rod 5 being extended, the piston nonreturn valve 14 closes and the bottom nonreturn valve 13 opens. The damping medium then flows, according to the piston ring volume, out of the working space 10 via the annular duct 15 through the damping valve 16 into the high-pressure chamber 3. The dimensioning of the displacement surfaces (piston rod surface/piston ring surface) makes it possible to achieve different volume flows which then flow through the damping valve 16 in the same direction, but allow a variation in the damping spread between the tension and compression stage. Although the piston rod 5 has a hollow design, a person skilled in the art understands by the term "piston rod surface" the cross-sectional surface of a solid piston rod. The designation "piston ring surface" refers to that surface of the working piston 28 which faces the piston rod 5 and which consists of the surface starting from the inner wall of the working cylinder 27 and extending as far as the outer surface of the piston rod 5. If the piston rod surface and the piston ring surface have a different size, a different volume is moved in the compression stage and in the tension stage. This means that, with the same setting of the damping valve 16, the damping force can have a different rating between the tension stage and the compression stage. An actuating element 17, designed essentially as a piston, separates the high-pressure control space 18 and the low-pressure control space 19 sealingly from one another, the extension of the actuating element 17 passing sealingly through an intermediate bottom 20, on the other side of which a valve element 21 is arranged. Between the control element 17 and the intermediate bottom 20 is arranged a spring 22 which holds the control element 17 against the outer stop 23. The duct 24a connects the high-pressure chamber 3 to the high-pressure control space 18 and the duct 24b connects the low-pressure chamber 2 to the low-pressure control space 19.

When the flow acts upon the damping valve 16 in the case of a low load of the vehicle, the pressure difference of the high-pressure control space 18 and the low-pressure control space 19 is only insignificant, so that the control element 17 is held against the outer stop 23 by the spring 22.

When the load of the motor vehicle is increased, the pressure of the high-pressure control space 18 also rises, the pressure of the low-pressure control space 19 simultaneously falling. The result is a travel adjustment of the control element 17 toward the spring 22 and a raising of the damping force, since the valve 21 is acted upon by a higher pressurization. So that the pressure fluctuations in the case of extremely long piston rod strokes do not overly impair the damping, a throttle 25 is provided preferably in the duct 24a. However, the throttle may also be executed in the duct 24b or in both ducts 24a and 24b.

The characteristic of the load-dependent damping adjustment can be varied by means of the dimensioning of the pressure-loaded surfaces on the control element 17 or by the choice of the spring 22. If a damping maximum is not to be exceeded, the control element 17 can come to bear against an inner stop 26.

Figure 2:
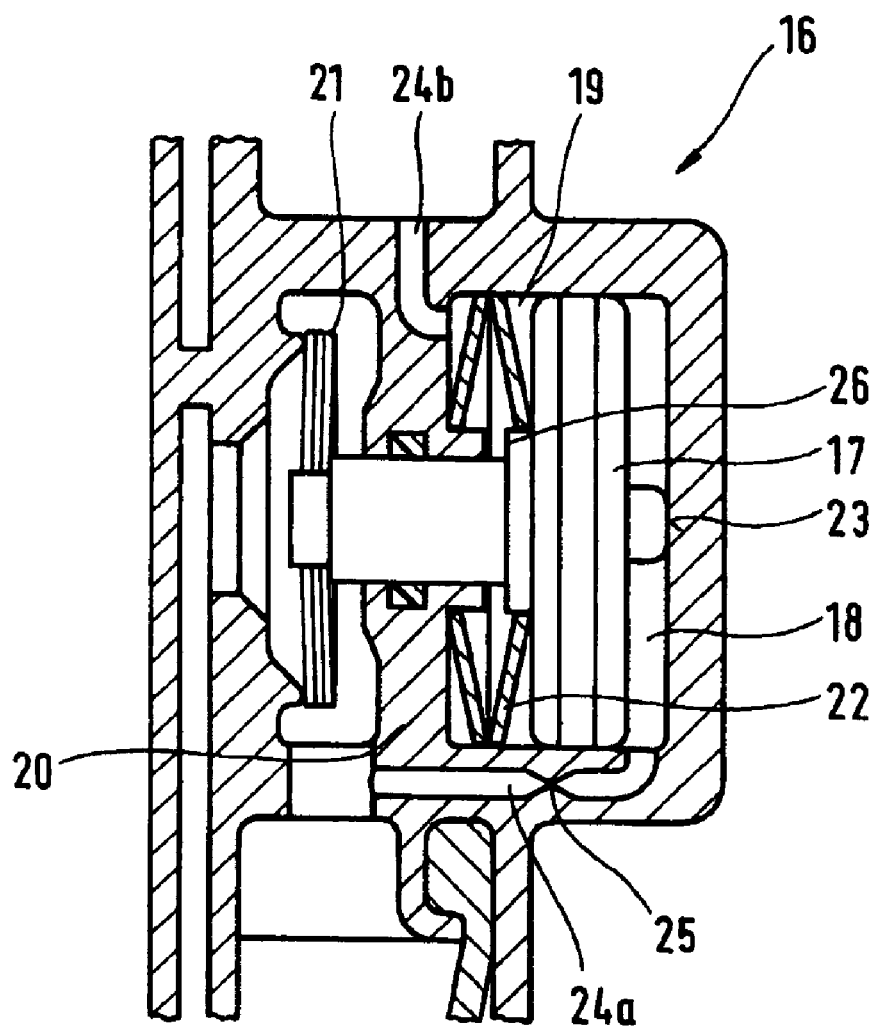
FIG. 2 shows in section, as a detail, the adjustable damping valve illustrated in FIG. 1.

However, the version of the valve 21 designed as a plate valve in FIGS. 1 and 2 can also be designed as a helical spring valve, a combination valve or a similar valve.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping hydropneumatic spring strut with internal level control, said spring strut comprising:
    a high pressure chamber containing a gas cushion acting as a spring;
    a working cylinder which is filled with damping medium under pressure of said gas cushion;
    a working piston carried by a hollow piston rod and dividing said working cylinder into two working spaces, one of said working spaces being connected to said high pressure chamber to drive said piston under the pressure of said gas cushion, said piston having at least one non-return valve which permits flow from said one of said working spaces to the other of said working spaces;

a low pressure chamber;

a piston pump comprising a pump cylinder formed by said hollow piston rod and a hollow pump rod received in said piston rod, said pump rod having a bore with one end connected to said low pressure chamber and another end carrying a non-return valve which permits flow from said low pressure chamber into said hollow piston rod, and a cut-off orifice which connects said one of said working spaces to said low pressure chamber as a function of the position of said piston in said working cylinder; and an adjustable damping valve connected to a duct running from the other of said working spaces, said adjustable damping valve having an actuating element acted on by the pressure in said high pressure chamber and the pressure in said low pressure chamber.

2. A spring strut of claim 1, wherein said actuating element is spring-loaded in one direction.

3. A spring strut of claim 1, wherein said adjustable damping valve comprises a valve element which is controlled by said actuating element.

4. A spring strut of claim 3, wherein said valve element is a spring washer valve.

5. A spring strut of claim 1, comprising at least one flow connection which provides flow from a respective at least one of said high pressure chamber and said low pressure chamber to said actuating element.

6. A spring strut of claim 1, wherein at least one said flow connection has a throttle.

7. A spring strut of claim 1, wherein said actuating element comprises a piston arranged in a housing and having one end face acted on by pressure of the high-pressure chamber and an opposed and face acted on by pressure of the low-pressure chamber.

8. A spring strut of claim 1, wherein said actuating element comprises at least one stop which limits movement in a respective at least one direction.

* * * * *